(No Model.)

J. P. DEVER.
COTTON CHOPPER, SCRAPER, AND CULTIVATOR.

No. 267,843. Patented Nov. 21, 1882.

WITNESSES:
Thos Houghton.
Jeon C Kenion

INVENTOR:
John P. Dever
BY
ATTORNEYS.

UNITED STATES PATENT OFFICE.

JOHN P. DEVER, OF BATESVILLE, ARKANSAS, ASSIGNOR TO HIMSELF AND WILLIAM J. PEARSON, OF SAME PLACE.

COTTON CHOPPER, SCRAPER, AND CULTIVATOR.

SPECIFICATION forming part of Letters Patent No. 267,843, dated November 21, 1882.

Application filed May 24, 1882. (No model.)

*To all whom it may concern:*

Be it known that I, JOHN P. DEVER, of Batesville, in the county of Independence and State of Arkansas, have made a new and useful Improvement in Combined Cotton Chopper, Scraper, and Cultivator; and I do hereby declare that the following is a full, complete, and exact description of the same, reference being had to the accompanying drawings, forming a part of this specification, in which—

Figure 1:
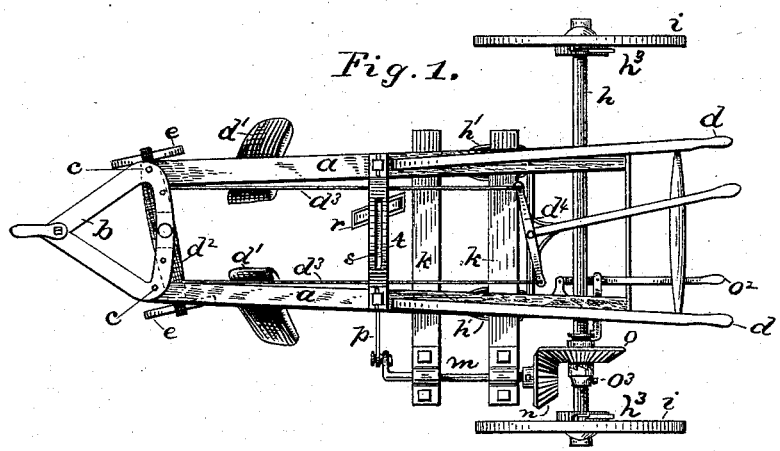
Figure 2:
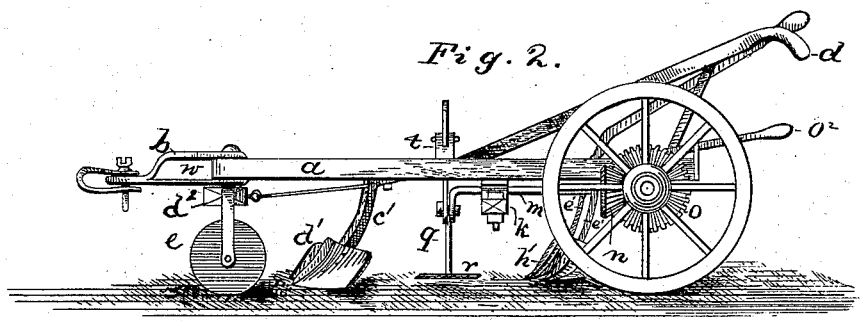
Figure 3:
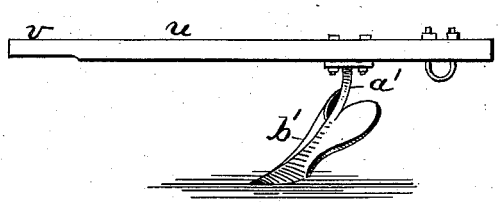

Figure 1 is a plan view of my invention; Fig. 2, a side elevation of the same, and Fig. 3 a side elevation of a removable beam and plow to be used in connection with the main frame.

My invention relates to an improved cotton chopper, scraper, and cultivator combined in the same implement; and it consists of the peculiar arrangement and construction of the parts, as hereinafter more fully set forth.

In the accompanying drawings, $a$ $a$ represent the two longitudinal beams of my improved implement, connected together at their forward ends by the draft attachment $b$, which is secured to the forward ends of the beams $a$ $a$ by the bolts $c$ $c$, so that the rear ends of the beams are adapted to be spread out laterally slightly.

$d$ represents the handles, of the usual construction, and $e$ $e$, represent caster-wheels, having their standards secured to the cross-beam $d^2$, which is pivoted at its center to the frame and connected by rods $d^3$ $d^3$ to a T-shaped lever, $d^4$, at the rear of the machine.

$h$ represents an axle, journaled in the under faces of the beams $a$ near their rear ends, and carrying the wheels $i$ $i$ on its ends, which support the rear ends of the beams $a$.

$k$ $k$ represent two parallel transverse beams mortised into the under faces of the beams $a$, and secured thereto by screws, so that the beams may be removed when desired. The ends of the transverse beams $k$ extend laterally on one side beyond the beam $a$, and in their extensions is journaled the horizontal crank-shaft $m$, carrying the bevel-gear $n$ at its rear end, which meshes with the bevel-gear $o$, sliding on the axle $h$ by means of lever $o^2$, and having clutch $o^3$, whereby the crank-shaft $m$ is revolved in the forward movement of the machine, the pawls and ratchets $h^3$ preventing the axle from turning backward.

$p$ represents a pitman, secured at its outer end to the wrist-pin of the crank, the opposite end of the pitman being pivotally connected to the handle $q$ of the chopper $r$. The upper end of the handle $q$ of the chopper passes through and is pivoted in a curved slot, $s$, in the transverse arch $t$, removably secured by screws or otherwise to the beams $a$. By this construction it will be seen that as the machine moves forward a reciprocating movement similar to that of a hoe operated by hand will be imparted to the chopper, and that the chopper, its supports and operating mechanism, can readily be removed from the beams $a$ $a$, or secured thereto, when desired, by the removal or insertion of six screws or bolts.

$u$ represents a beam provided with a tenon, $v$, at its forward end, adapted to be inserted in a mortise, $w$, in the rear end of the draft attachment, a pin passing through holes in the draft attachment $b$ and beam $u$ being employed, so that the beam can be removed or secured to the frame, as desired.

Near the rear end of the beam $u$ is secured a standard, $a'$, to which the double plow $b'$ is secured in the usual manner.

$c'$ $c'$ represent standards secured to the beams $a$ $a$ in rear of the caster-wheels, and lying opposite each other, to which scrapers $d'$ $d'$ may be secured.

$e'$ $e'$ represent similar standards secured to the beams $a$ $a$ in rear of the chopper-frame, carrying cultivator-teeth $h'$ $h'$. If it be desired to use the implement as a cotton chopper and scraper, the beam $u$ is removed, the caster and rear wheels are made to straddle a row, and the implement is drawn forward, the scrapers $d'$ $d'$ scraping each side of the row, and the reciprocating movement imparted to the chopper thinning out the plants to a proper "stand," while the rear teeth cultivate the soil close to the ridge.

If it is desired to break ground, the cotton-chopper and its frame and arch are removed by removing the six bolts or screws that secure them to the beams $a$ $a$. The beams $a$ $a$ are then spread out somewhat in rear. The third beam, $u$, is then introduced into position, and turning-plows are secured at an angle to one of the scrapers and cultivator-standards.

For ridging ground, put left and right hand turn-plows on front standards and double plow in rear.

For cultivating, detach scrapers and choppers, place two small turn-plows in front, and in rear place right-hand plow on left-hand beam and left-hand plow on right-hand beam.

By means of the lever $d^4$, connected to the casters $e$, the latter may be instantly turned aside to control the movement of the device.

What I claim as my invention, and desire to secure by Letters Patent, is—

1. The combination, with the frames $a\,k$, the axle $h$, and wheels $i$, of the bevel-gears $n\,o$, crank-shaft $m$, the pitman $p$, the transverse slotted arch $t$, and the chopper $q\,r$, pivoted in the slot of the said arch, substantially as and for the purpose set forth.

2. The combination, with the axle $h$, the wheels $i$, the frame $a$, and the frame $k$, detachably secured thereto, and projecting from one side thereof, of the bevel-gears $n\,o$, the crank-shaft $m$, having its bearings in the frame $k$, the pitman $p$, the detachable slotted arch $t$, and the chopper $q\,r$, pivoted in the slot of the arch, substantially as and for the purpose set forth.

JOHN PLEASANT DEVER.

Witnesses:
WILLIAM TAYLOR,
M. A. WYCOUGH.